Patented Feb. 1, 1944

2,340,506

UNITED STATES PATENT OFFICE 2,340,506

MANUFACTURE OF NONMETALLIC ELECTRICAL RESISTANCE MATERIALS

Karl Biefeld, Bad Freienwalde, Oder, Germany; vested in the Alien Property Custodian No Drawing. Application August 5, 1940, Serial No. 351,556. In Germany August 5, 1936

7 Claims. (Cl. 201—76)

This invention relates to a process of plastifying non-metallic electric resistance materials with the object of increasing their plasticity by treating same by means of an extruding press.

The materials which are suited to the production of technically useful non-metallic resistance bodies, particularly such materials which, prior to the usual plastification process, are subjected to a pre-sintering or pre-melting procedure and which are in a crystalline state, can not be maintained in the desired plastic condition by the binders generally used when plastification is imparted by pressure, such as water glass, sirup, or sulfite liquor. On the other hand, the methods for the production of plastic refractory masses, as employed in the ceramic industry, are unsatisfactory in this case because ceramic products as for instance clays, even in smallest quantities, may not be added to the resistance materials since the presence even of a small amount would entirely change their electric properties.

The following conditions must be maintained for the plastification of electric resistance materials:

(1) Binders and lubricants of organic type must be volatile at the drying or pre-burning stage without leaving residues.

(2) Inorganic additions, unless they are volatilized when burning, must be of such a nature that they have no, or if any, only a favourable action upon the electric properties of the resistance mass. Their main object is to fill up the tiny spaces still present between the single granules of the primary mass so as to form a compact or dense body. Moreover, owing to their swelling capability, caused by the absorption of water, they will support the organic binding and lubricating agents by their tendency to agglomerate and by coating the mass grains and thus rendering the same round.

(3) The amount of added organic agents should conveniently be kept small so that an excessive porosity of the masses which have been sintered after the plastification procedure is avoided.

According to the invention, the additives employed for plastifying the masses mentioned above are divided into three kinds of which at least one of each kind must be present:

(1) Agents for insuring the cohesion during the plastification stage, i. e. agglutinants or binders. There may be used: lacquers, varnishes, glues, sirup, etc.

(2) Agents for rendering supple or sliding agents such as fatty substances, soaps, oils, emulsions, etc.

(3) Amorphous metal oxides of a high temperature-resistance to fill up the spaces between the single little crystals of the primary mass, which are very finely divided and may be won by precipitation. For example, certain oxides may be used for this purpose which, during the sintering procedure are incorporated throughout the resistance masses, thus forming either equal or similar chemical compounds of an higher order, or reacting with the primary mass to form a solid solution without having a detrimental action on the electric properties of the treated mass.

It is a supposition for the combined use of the three kinds of additives that those employed at once should not repel each other. For example, as sliding agent there should not be added a water repelling heavy mineral oil to a water soluble agglutinant such as dextrine (British gum). Of the ingredients indicated under number 3 those substances are particularly suitable which, when very finely divided, show a strong agglomerating tendency as for instance zinc oxide. Depending on the nature of the particular starting material for the resistance body the suitable inorganic additives are to be selected. Thus, for instance, iron oxide is used in resistance masses of a spinel type, having the property to turn into magnetite (ferrosoferric oxide) when burnt up to 1200° C., which itself is of a spinel type and, due to its isomorphisme, will react with the base substance forming an intimate combination (solid solution). For base substances of a zincite character zinc or cadmium oxide are to be chosen. The following may serve as an example for an entire composition of primary material and admixtures.

In order to plastify a base mass consisting of magnesium ferrite one should take as substance 1: 5% of linseed oil varnish, as substance 2: 5% of soft soap and as substance 3: 10% of finely divided iron oxide which, if desired, has been obtained by precipitation.

When processing the thus composed mass, one has to operate in the following manner: First the substances 1 and 2 are well intermixed or, if necessary i. e. if they should first repell each other, emulsified. Thereupon substance 3 is added and mixed with 1 and 2 until a thin, homogeneous paste is obtained. The base substance is then introduced therein with constant kneading until the intended quantity or the desired consistency have been obtained.

In general, the quantity of the volatile additives may be kept so small as to amount altogether to the maximum of ten per cent, based on the weight of the whole material. This is absolutely necessary in order to yield densely sintered resistance bodies and to avoid too great a shrinkage when burning.

Having now particularly described and ascertained the nature of my said invention and in what manner the same is to be performed, I declare that what I claim is:

1. A process of plastifying non-metallic electric resistance materials manufactured with the extruding press, which are free from refractory ceramic products, such as clays, characterized by the feature that three kinds of substances are added to a pre-sintered crystalline base material consisting of metal-oxide compounds of spinel and zincite, said three kinds of substances being (a) a binder, (b) a lubricant adapted to produce plasticity, and (c) a high-temperature-resistant, amorphous metal oxide in a very finely divided state adapted to fill the spaces between the single particles of the base material, of such a character that, after sintering, it forms an intimate chemical association with the base material without substantially affecting the electric properties of the final product as compared with the base material.

2. A process according to claim 6, characterized by the feature that the binder belongs to a group consisting of lacquers, varnishes and glues.

3. A process according to claim 6, characterized by the feature that the lubricant belongs to a group consisting of fatty substances, soaps, oils and emulsions thereof.

4. A process according to claim 6, characterized by the feature that the metal oxide belongs to a group consisting of iron oxide, zinc oxide and cadmium oxide.

5. A process according to claim 6, characterized by the feature that a metal oxide is used which swells upon taking up moisture and has an agglomerating tendency.

6. In the process of manufacturing non-metallic electric resistances from metal-oxide base material consisting of metal-oxide compounds of spinel and zincite which are free from refractory ceramic products, such as clays, the steps which comprise mixing with such a base material a binder, a lubricant and a metal oxide which is isomorphic with said material and capable of forming a solid solution with said material during the subsequent firing operation, forming a paste from said mixture and passing the paste through an extruding press thereby increasing the plasticity of said paste, said binder and lubricant being volatile during the firing operation.

7. In the process of manufacturing non-metallic electric resistances, the steps which comprise mixing together magnesium ferrite, up to about 5 per cent of varnish as a binder, up to about 5 per cent of soft soap as a lubricant and up to about 10 per cent of finely divided iron oxide, making a paste from said mixture and passing the same through an extruding press thereby increasing the plasticity of said paste.

KARL BIEFELD.